United States Patent
Koku et al.

(10) Patent No.: US 9,156,323 B2
(45) Date of Patent: Oct. 13, 2015

(54) SUSPENSION DEVICE FOR A VEHICLE

(76) Inventors: Ahmet Bugra Koku, Ankara (TR);
Erhan Ilhan Konukseven, Ankara (TR);
Mustafa Cihangir Kul, Ankara (TR)

( * ) Notice: Subject to any disclaimer, the term of this patent is extended or adjusted under 35 U.S.C. 154(b) by 371 days.

(21) Appl. No.: 13/808,598

(22) PCT Filed: Jul. 7, 2010

(86) PCT No.: PCT/TR2010/000141
§ 371 (c)(1),
(2), (4) Date: Jan. 6, 2013

(87) PCT Pub. No.: WO2012/005705
PCT Pub. Date: Jan. 12, 2012

(65) Prior Publication Data
US 2013/0106074 A1    May 2, 2013

(51) Int. Cl.
*B60G 3/01*    (2006.01)

(52) U.S. Cl.
CPC ............... *B60G 3/01* (2013.01); *B60G 2204/30* (2013.01); *B60G 2204/4232* (2013.01)

(58) Field of Classification Search
CPC ............... B60G 3/01; B60G 2204/124; B60G 2204/30; B60G 2204/4232
USPC .................... 267/195, 170; 280/5.5, 124.127, 280/124.179; 301/133, 136
See application file for complete search history.

(56) References Cited

U.S. PATENT DOCUMENTS

| | | | | |
|---|---|---|---|---|
| 1,972,886 A | * | 9/1934 | Goebert | 301/133 |
| 2,049,963 A | * | 8/1936 | Lancia | 280/124.127 |
| 2,054,063 A | * | 9/1936 | Chedru | 267/238 |
| 2,563,370 A | * | 8/1951 | Reese | 267/290 |
| 3,411,806 A | * | 11/1968 | Bellairs | 280/124.127 |
| 4,460,186 A | * | 7/1984 | Hildebrand et al. | 280/92 |
| 4,875,706 A | * | 10/1989 | Joseph et al. | 280/124.127 |
| 5,248,011 A | * | 9/1993 | Richards | 180/215 |
| 6,357,770 B1 | * | 3/2002 | Carpiaux et al. | 280/124.127 |
| 6,364,078 B1 | * | 4/2002 | Parison et al. | 188/380 |
| 7,287,611 B2 | * | 10/2007 | Nagaya | 180/65.51 |
| 7,306,065 B2 | * | 12/2007 | Nagaya | 180/65.51 |
| 7,770,677 B2 | * | 8/2010 | Takenaka | 180/65.51 |
| 7,938,210 B2 | * | 5/2011 | Kunzler et al. | 180/65.51 |
| 8,746,383 B2 | * | 6/2014 | Basadzishvili | 180/65.51 |
| 2008/0185807 A1 | | 8/2008 | Takenaka | |

FOREIGN PATENT DOCUMENTS

| | | | |
|---|---|---|---|
| EP | 0982162 A2 | | 3/2000 |
| GB | 359466 A | | 10/1931 |
| GB | 480467 A | | 2/1938 |
| JP | 2007161195 A | * | 6/2007 |
| JP | 2008174144 A | * | 7/2008 |

* cited by examiner

*Primary Examiner* — Laura Freedman
(74) *Attorney, Agent, or Firm* — Gokalp Bayramoglu

(57) ABSTRACT

This invention relates to a suspension particularly for every type of land vehicles and additionally for robotic applications, which can be used in bilateral operations, such as fully automated unmanned vehicles that can be driven on both sides (up and down) or in robots which can be capable of executing multi functional movements.

4 Claims, 4 Drawing Sheets

SUSPENSION DEVICE FOR A VEHICLE

RELATED FIELD OF THE INVENTION

Figure 1:
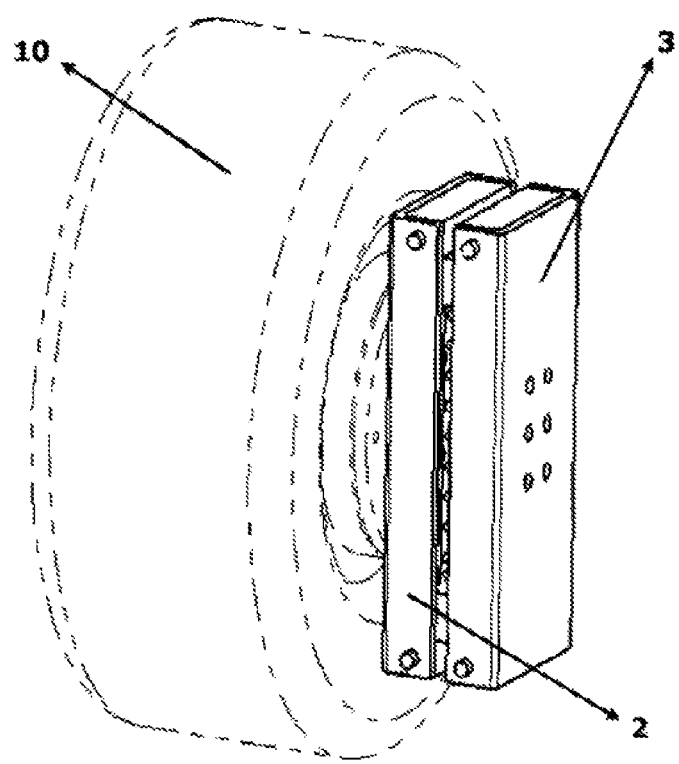

This invention relates to a suspension particularly for every type of land vehicles and additionally for robotic applications, which can be used in bilateral operations, such as fully automated unmanned vehicles that can be driven on both sides (up and down) or in robots which can be capable of executing multi functional movements.

BACKGROUND OF THE INVENTION (PRIOR ART)

All types of land vehicles in the prior art are considered as one-sided vehicles since they have a specific orientation (i.e. top and bottom of the vehicle) for proper operation. Hence, their suspensions are designed accordingly to perform only in one direction.

However, with the ever-growing robotics technology, all types of unmanned vehicles and other types of robots begin to intervene into field applications and daily usage. So called advancements in robotics and vehicle technologies makes it a necessity to develop a novel suspension which can provide symmetric performance regardless of the vehicle's orientation (upside down or not).

In the current suspension designs of the prior art, one end of the spring/piston couple is connected to the vehicle chassis and the other end is connected to the wheel structure with either a fixed or a revolute joint. Due to this arrangement normal suspensions work only in one direction since the springs work only in compression.

This limited operational capability of the suspensions known in the prior art, makes them impossible to be used in new robotics and unmanned vehicles technologies where the vehicle is to operate upside down or not and is not subject to deep hole problem.

Besides this technical deficiency, conventional suspensions of the prior art cannot function properly when the wheels of a vehicle encounter with a deep hole. In this situation, because of their limited functioning capabilities, the suspensions stay in their elongated state and cease to perform their functions against a deep hole.

In the prior art, there are some patent documents trying to overcome the deep hole problem by using two sets of springs with non-movable ends. GB 359466 A, JP 2007161195 A, JP 2008174144 A, US 2008185807 A1 can be regarded as the examples of this application.

The invention subject to GB 359466 A, is trying to overcome the deep hole problem by using two sets of springs with non-movable ends with staying stick to the known orientation of the conventional suspensions in respect to the vehicle chassis.

The other inventions subject to JP 2007161195 A and JP 2008174144 A are trying to overcome the deep hole problem by using two sets of springs with non-movable ends by placing the system inside the wheel rim itself. This system is also known as "in-wheel suspension system" in the prior art.

The other invention subject to US 2008185807 A1, is trying to overcome the deep hole problem by using single set of spring with ends connected to pivot jointed arms by placing the system inside the wheel rim itself. This system is also an "in-wheel suspension system".

However, these applications have the similar technical problem. On uneven road surfaces or while encountering a deep hole situation, the springs of the said systems try to work against each other causing both excessive usage of material and work loss instead of bringing any technical advantage and proper solution for the problem.

In addition to all these present technical problems, the near future is likely to create a new technical problem for the known suspensions in the prior art in respect to ever-growing robotics technology that makes it possible to develop more kinds of unmanned vehicles and other types of robots. Some of these newly developed unmanned vehicles and other types of robots will need to operate symmetrically regardless of their orientation (upside down or not). Hence, regarding these new operational conditions, a novel suspension system has to be developed which can provide symmetric performance regardless of the vehicle's or robot's orientation with respect to the ground (upside down or vice versa).

BRIEF DESCRIPTION OF THE INVENTION

The main principle of the present invention is to compress the piston/spring couple between the wheel and the body (chasis) of the vehicle at all times, independent of the wheel movement (i.e. upwards or downwards). In order to achieve this operational capability, both ends of the spring/piston couple can move along their axis vertical to the wheel axis. The length of the spring/piston couple depends on the distance between the vehicle body and the tire structure's suspension connection end planes. By means of this operational capability, the piston/spring couple can be compressed whether the tire moves upwards or downwards with respect to the vehicle body.

The technical advantages achieved by the development of this invention makes this bilateral operating suspension perfectly suitable for fully automated unmanned vehicles which can move upside down and which must have extreme off-road capabilities or for all types of robots which are capable of executing multi functional movements.

DEFINITION OF THE FIGURES

In order to explain the present invention in more detail, the following figures have been prepared and attached to the description. The list and the definition of the figures are given below.

FIG. 1—Perspective view of the bilateral operating suspension assembly

Figure 2:
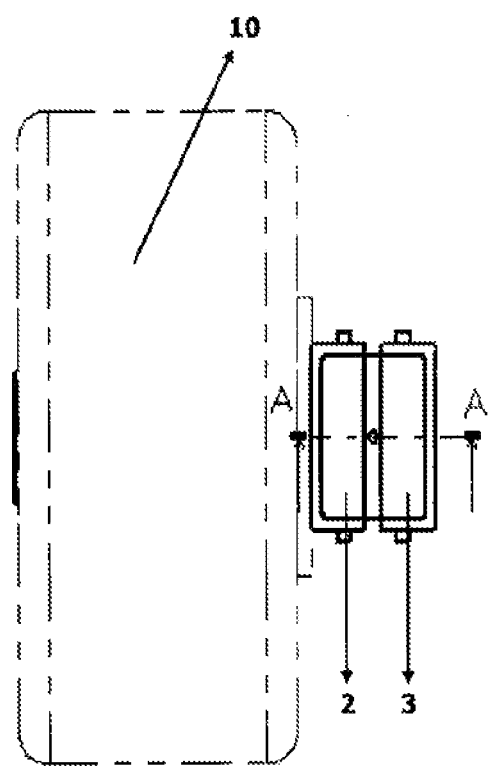

FIG. 2—Top view of the bilateral operating suspension assembly

Figure 3:
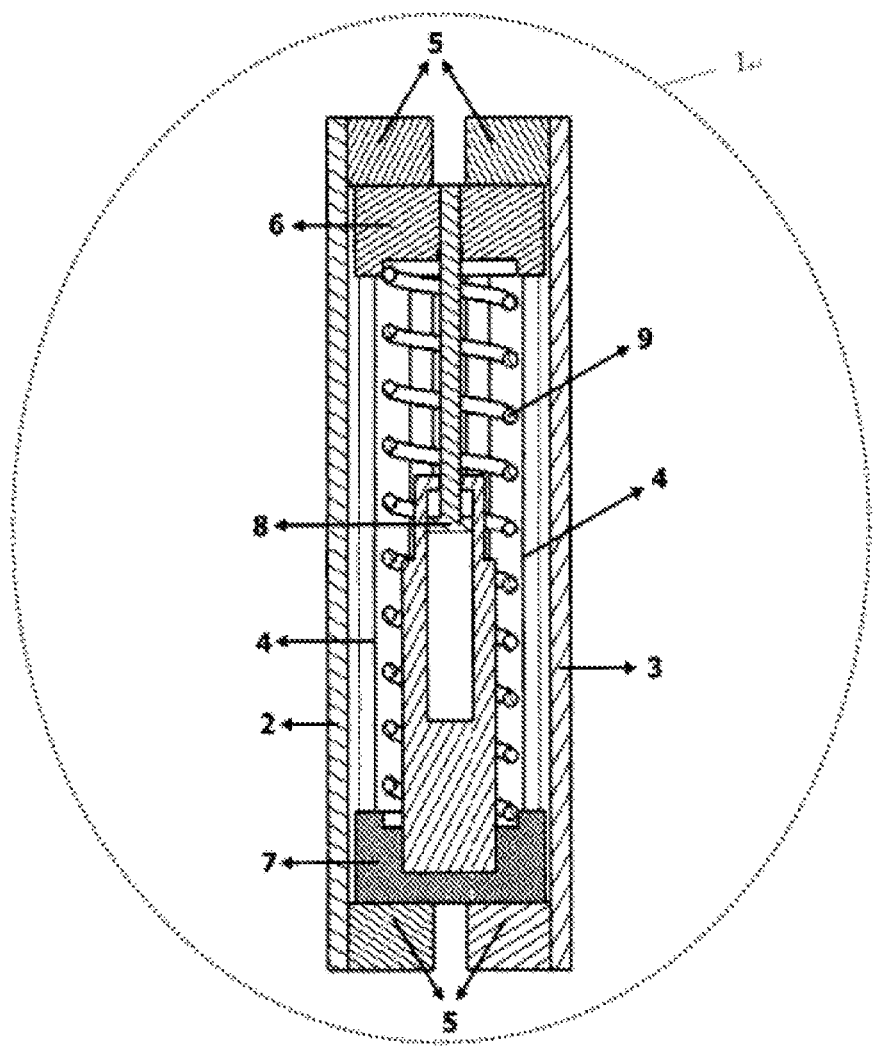

FIG. 3—Cross section view of the bilateral operating suspension

Figure 4:
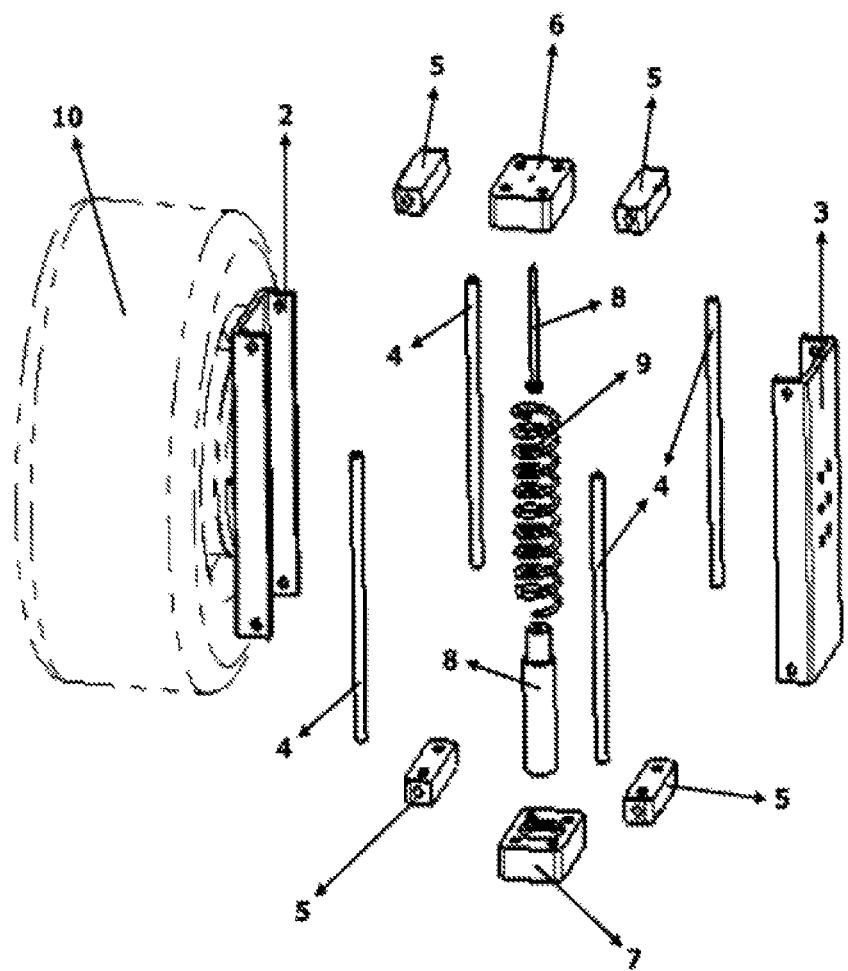

FIG. 4—Exploded view of the bilateral operating suspension

DEFINITION OF THE ELEMENTS (FEATURES/COMPONENTS/PARTS) ON THE FIGURES

The definition of the features/components/parts which are covered in the figures that are prepared in order to explain the present invention better are separately numbered and given below.

1. Bilateral operating suspension
2. Suspension tire structure connector
3. Suspension vehicle body connector
4. Slider beds
5. Slider stoppers
6. Upper end slider
7. Lower end slider
8. Piston
9. Spring
10. Tire structure

DETAILED DESCRIPTION OF THE INVENTION

Bilateral Operating Suspension (1) described in the present invention consists of 8 main parts;

Suspension tire structure connector (2)
Suspension vehicle body connector (3)
Slider beds (4)
Slider stoppers (5)
Upper end slider (6)
Lower end slider (7)
Piston (8)
Spring (9)

The bilateral operating suspension (1) is assembled to the vehicle body and the tire structure (10) by the suspension vehicle body connector (3) and suspension tire structure connector (2). The suspension vehicle body and suspension tire structure connectors (2, 3) also function as the casing of the other components (4, 5, 6, 7, 8 and 9) of the bilateral operating suspension (1).

Inside the casing formed by the suspension vehicle body connector (3) and suspension tire structure connector (2), slider beds (4) are fixed to the suspension vehicle body connector (3) and suspension tire structure connector (2) by the slider stoppers (5). The upper end slider (6) and the lower end slider (7) are connected to the piston (8) from both sides and a spring (9) is located between the upper end slider (6) and the lower end slider (7). The upper end slider (6) and the lower end slider (7) are assembled such that they can slide freely on the slider beds (4) in the direction of the axis of the slider beds (4) to compress and decompress the piston (8) and the spring (9) for damping the vertical forces created by the movements of the tire structure (10) and the vehicle body in the opposite vertical directions relatively to each other by the bilateral operating suspension.

During the bilateral operating suspension's operation, when the tire structure (10) and the vehicle body moves to the opposite vertical directions relatively to each other along the direction of the slider beds (4) axis, the slider stoppers (5) at the opposite ends of the suspension vehicle body connector (3) and suspension tire structure connector (2) moves closer to each other. This action also makes the upper end slider (6) converge to the lower end slider (7) with compressing the piston (8) and the spring (9). In this process, the vertical forces created by this converging movement are transferred to the piston (8)/spring (9) couple to be damped by the bilateral operating suspension.

While the invention is described in detail in the foregoing embodiments for the purpose of illustration, those skilled in the art will recognize that the invention can be practiced with variations within the scope and spirit of the following claims.

The invention claimed is:

1. A bilateral operating suspension for damping forces created by movements of a tire structure and a vehicle body in opposite directions relative to each other, comprising:
   a suspension tire structure connector;
   a suspension vehicle body connector;
   a plurality of slider beds; a plurality of slider stoppers;
   an upper end slider; a lower end slider;
   a piston; and
   a spring;
   wherein the bilateral operating suspension is assembled to the vehicle body and the tire structure by the suspension vehicle body connector and the suspension tire structure connector; and
   wherein the plurality of slider beds are fixed to the suspension vehicle body connector and the suspension tire structure connector by the plurality of slider stoppers;
   wherein the suspension vehicle body connector and the suspension tire structure connector form a casing for the plurality of slider beds, the plurality of slider stoppers, the upper end slider, the piston and the spring;
   wherein the upper end slider and the lower end slider are connected to the piston on both sides of the piston by using the spring, and the upper end slider and the lower end slider slide freely in the plurality of slider beds in the direction of a plurality of axes of the plurality of slider beds to compress and decompress the spring and the piston.

2. The bilateral operating suspension as in claim 1, wherein the plurality of slider beds provides a free slide of the upper end slider and the lower end slider in the direction of its own axis.

3. The bilateral operating suspension as in claim 1, wherein the plurality of slider stoppers are used to fix the plurality of slider beds to the suspension vehicle body connector and to the suspension tire structure connector.

4. The bilateral operating suspension as in claim 1, wherein the piston and the spring damp the forces created by a converging movement of the upper end slider and the lower end slider related to the movements of the tire structure and the vehicle body in the opposite directions relative to each other.

* * * * *